United States Patent [19]

Kogita et al.

[11] Patent Number: 5,537,263

[45] Date of Patent: Jul. 16, 1996

[54] UNDER VIEW MIRROR APPARATUS FOR A VEHICLE

[75] Inventors: Hidekazu Kogita, Kariya; Masumi Nishikawa, Toyoake; Shoji Okada, Anjo, all of Japan

[73] Assignee: Aisin Seiki Kabushiki Kaisha, Kariya, Japan

[21] Appl. No.: 91,293

[22] Filed: Jul. 15, 1993

[30] Foreign Application Priority Data

Jul. 30, 1992 [JP] Japan .................................. 4-204099

[51] Int. Cl.⁶ .................................................. B60R 1/06
[52] U.S. Cl. ........................... 359/841; 359/843; 359/877; 359/881
[58] Field of Search .................................. 359/841, 844, 359/872, 877, 881, 873

[56] References Cited

U.S. PATENT DOCUMENTS

| 3,468,218 | 9/1969 | Schimmelpfennig | 359/841 |
|---|---|---|---|
| 3,612,667 | 10/1971 | Orr | 359/841 |
| 3,820,877 | 6/1974 | Moyer | 359/841 |
| 4,469,405 | 9/1984 | Chin-Wun | 359/841 |
| 4,758,078 | 7/1988 | Bracamonte | 359/841 |
| 4,911,545 | 3/1990 | Miller | 359/841 |
| 4,936,669 | 6/1990 | Wun | 359/841 |
| 4,936,670 | 6/1990 | Yoo | 359/841 |
| 5,056,904 | 10/1991 | Okamura | 359/841 |
| 5,210,652 | 5/1993 | Perkinson | 359/877 |
| 5,375,014 | 12/1994 | Fujie et al. | 359/841 |

FOREIGN PATENT DOCUMENTS

| 0153743 | 9/1985 | European Pat. Off. | B60J 1/20 |
|---|---|---|---|
| 2543083 | 9/1984 | France | B60R 1/06 |
| 2663595 | 12/1991 | France | B60R 1/06 |
| 2681821 | 4/1993 | France | 359/877 |
| 808530 | 1/1952 | Germany . | |
| 2841974 | 4/1980 | Germany | B60R 1/06 |
| 3718125 | 8/1988 | Germany | 359/877 |
| 4011150 | 10/1991 | Germany | B60R 1/08 |
| 57-4440 | 1/1982 | Japan | B60R 1/06 |
| 58-194640 | 11/1983 | Japan | B60R 1/00 |
| 59-50834 | 3/1984 | Japan | B60R 1/06 |
| 60-179350 | 9/1985 | Japan | B60R 1/06 |
| 61-146653 | 7/1986 | Japan | B60R 1/06 |
| 61-150849 | 7/1986 | Japan | B60R 1/08 |
| 62-4441 | 1/1987 | Japan | B60R 1/08 |
| 1-127430 | 5/1989 | Japan | B60R 1/08 |
| 2-208143 | 8/1990 | Japan | B60R 1/06 |
| 3-28342 | 4/1991 | Japan | B60R 1/08 |
| 4-39140 | 2/1992 | Japan | B60R 1/06 |
| 4-133835 | 5/1992 | Japan | B60R 1/08 |
| 911251 | 11/1962 | United Kingdom . | |
| 2085382 | 4/1982 | United Kingdom | B60R 1/08 |

*Primary Examiner*—Paul M. Dzierzynski
*Assistant Examiner*—John Juba, Jr.
*Attorney, Agent, or Firm*—Burns, Doane, Swecker & Mathis

[57] ABSTRACT

An under view mirror apparatus for a vehicle comprises a mirror structure mountable on a rear portion of a vehicle and selectively positionable in either a first condition in which the mirror structure is stored in the rear portion of the vehicle and a second condition in which the mirror structure projects out from the rear portion of the vehicle, an operating mechanism which is adapted to be disposed between the rear portion of the vehicle and the mirror structure and which supports the mirror structure and moves the mirror structure between the first condition and the second condition. The operating mechanism includes a guide rail for being fixed on the rear portion of the vehicle, a first link slidably supported on the guide rail and connected with the mirror structure, and a second link connected to one of the mirror structure and the first link. The apparatus also includes a driving device connected to the operating mechanism for driving the operating mechanism.

15 Claims, 12 Drawing Sheets

UNDER VIEW MIRROR APPARATUS FOR A VEHICLE

BACKGROUND OF THE INVENTION

1. Field of the Invention

This invention relates to an under view mirror apparatus for a vehicle which is disposed on a rear portion of the vehicle for the purpose of securing and advancing the visibility in the rear portion of the vehicle. Furthermore, this invention relates to an under view mirror apparatus for a vehicle which can be selectively operated either in an unoperational condition in which the apparatus is stored in a deflecter disposed on the rear portion of the vehicle or an operational condition in which the apparatus projects out from the deflecter.

2. Description of the Related Art

A conventional under view mirror apparatus for a vehicle is shown in Japanese Patent Laid Open No. 1127430. The under view mirror apparatus comprises a mirror structure, a first operating mechanism, a second operating mechanism and a driving mechanism which drives the first operating mechanism. One of the first operating mechanism and the second operating mechanism is disposed on one side of the mirror structure and the other is disposed on the other side of the mirror structure. The first operating mechanism and the second operating mechanism each includes a belt pulley, a link and a timing belt. The mirror structure is disposed on a deflector through the first operating mechanism and the second operating mechanism. The second operating mechanism is operated by the operation of the first operating mechanism through the mirror structure. The mirror structure is selectively operated either in an unoperational condition in which the mirror structure is stored in a concave portion of the deflector or an operational condition in which the apparatus projects out from the concave portion of the deflector. The mirror structure comprises a convex mirror which reflects the rear and lower portions of the vehicle.

However, the conventional under mirror apparatus supports the mirror structure and transmits the driving torque to the link by the belt pulley and the timing belt. Therefore, the mirror structure is not supported in a steady manner. Also, the mirror structure is not able to be moved smoothly and often inclines when the mirror structure is moved because of slack in the timing belt. Consequently, the mirror structure often interferes with the deflector in the unoperational condition and the under view mirror apparatus sometimes cannot provide visibility.

SUMMARY OF THE PRESENT INVENTION

It is an object of the present invention to provide an improved under view mirror apparatus for a vehicle which can move a mirror structure in a smooth manner.

It is another object of the present invention to provide an improved under view mirror apparatus for a vehicle which provides visibility in the rear portion of a vehicle.

It is a further object of the present invention to provide an improved under view mirror apparatus for a vehicle which can support a mirror structure in a steady manner.

It is a further object of the present invention to provide an improved under view mirror apparatus for a vehicle which prevents a mirror structure from interfering with other things when the mirror structure is moved.

It is a further object of the present invention to provide an improved under view mirror apparatus for a vehicle which maintains an attractive appearance.

It is a further object of the present invention to provide an improved under view mirror apparatus for a vehicle which is simple in structure and small in size.

It is a further object of the present invention to provide an improved under view mirror apparatus for a vehicle which is lower in cost.

To achieve the above mentioned objects, an under view mirror apparatus for a vehicle in accordance with this invention comprises a mirror structure for being mounted on a rear portion of a vehicle which is selectively operated between a first condition in which the mirror structure is stored in the rear portion of the vehicle and a second condition in which the mirror structure projects out from the rear portion of the vehicle, and an operating mechanism adapted to be disposed between the rear portion of the vehicle and the mirror structure. The operating mechanism supports the mirror structure, and moves the mirror structure between the first condition and the second condition. The operating mechanism includes a guide rail for fixed being on the rear portion of the vehicle, a first link slidably supported on the guide rail and connected with the mirror structure, and a second link connected with one of the mirror structure and the first link. The apparatus also includes driving means connected with the operating mechanism for driving the operating mechanism.

BRIEF DESCRIPTION OF THE DRAWINGS

The features and advantages of the under view mirror apparatus for a vehicle according to the present invention will be more clearly appreciated from the following description in conjunction with the accompanying drawings wherein.

DETAILED DESCRIPTION OF A PREFERRED EMBODIMENTS OF THE INVENTION

Figure 1:
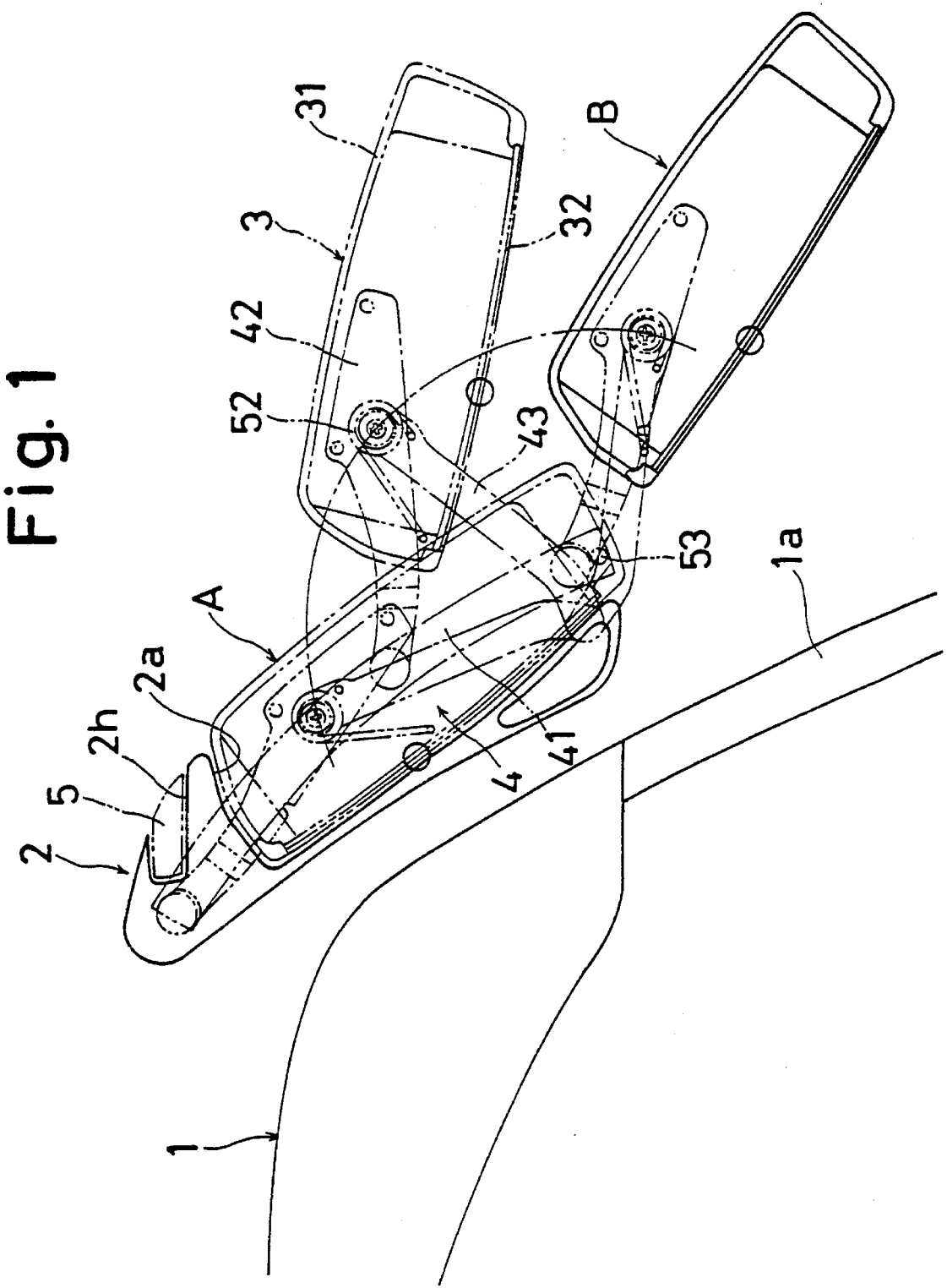
FIG. 1 is a sectional view of an under view mirror apparatus for a vehicle of the present invention taken along with the line 1—1 of FIG. 11.
Figure 2:
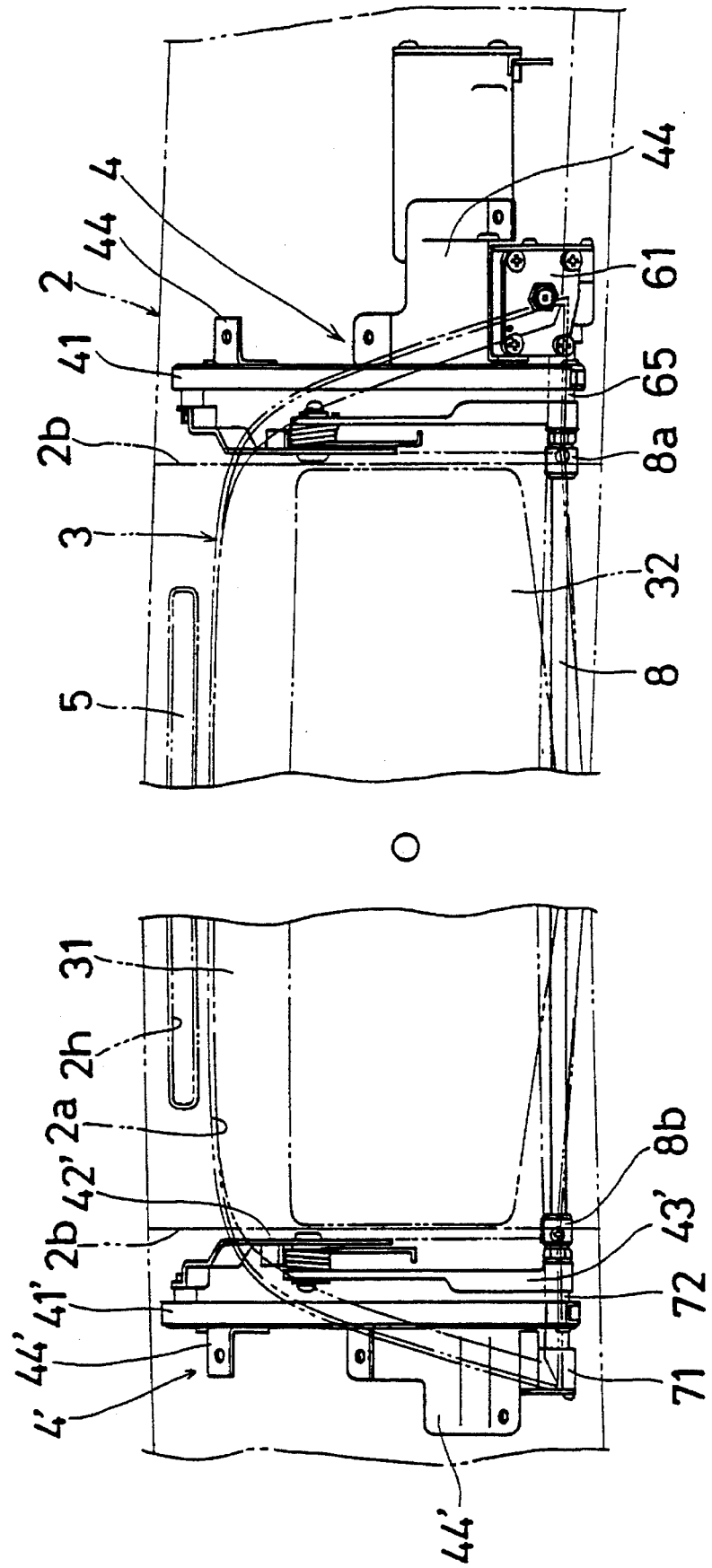
FIG. 2 is a plan view of an under view mirror apparatus for a vehicle shown in FIG. 1.
Figure 3:
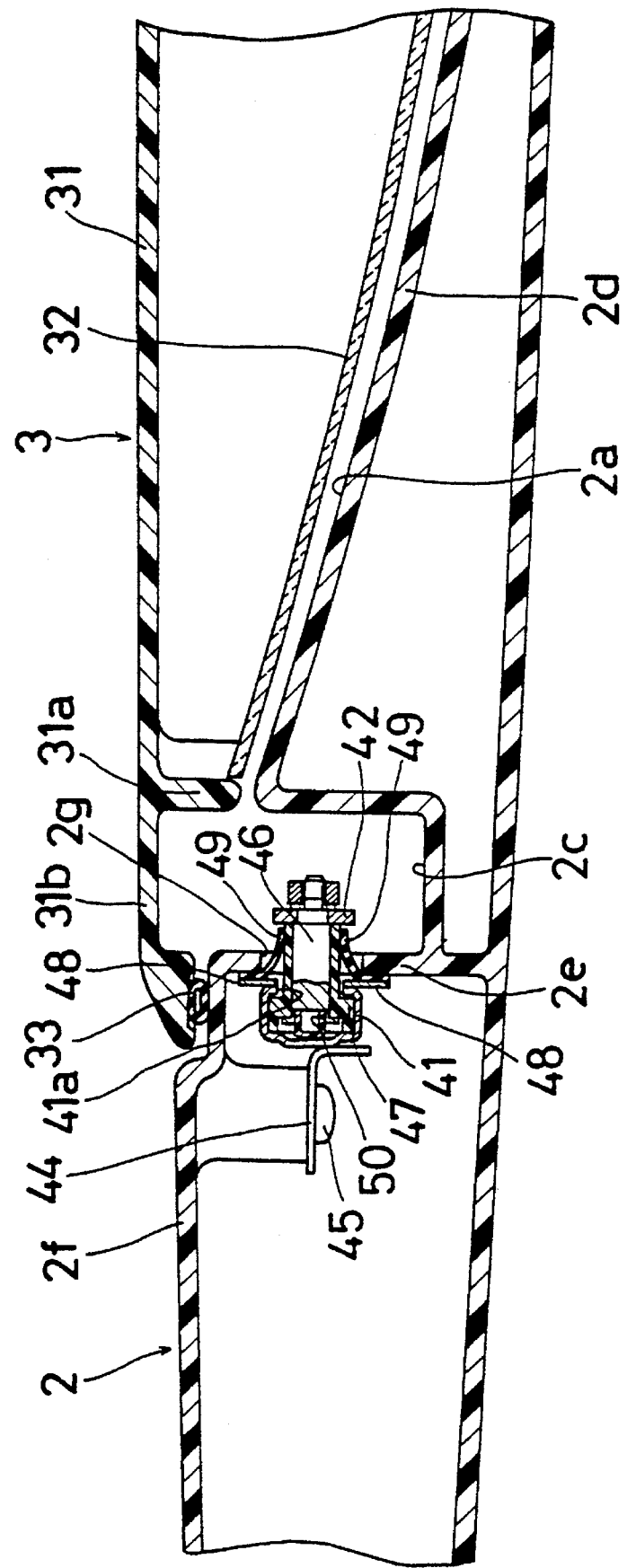
FIG. 3 is a partial sectional view of an under view mirror apparatus for a vehicle of the present invention.
Figure 4:
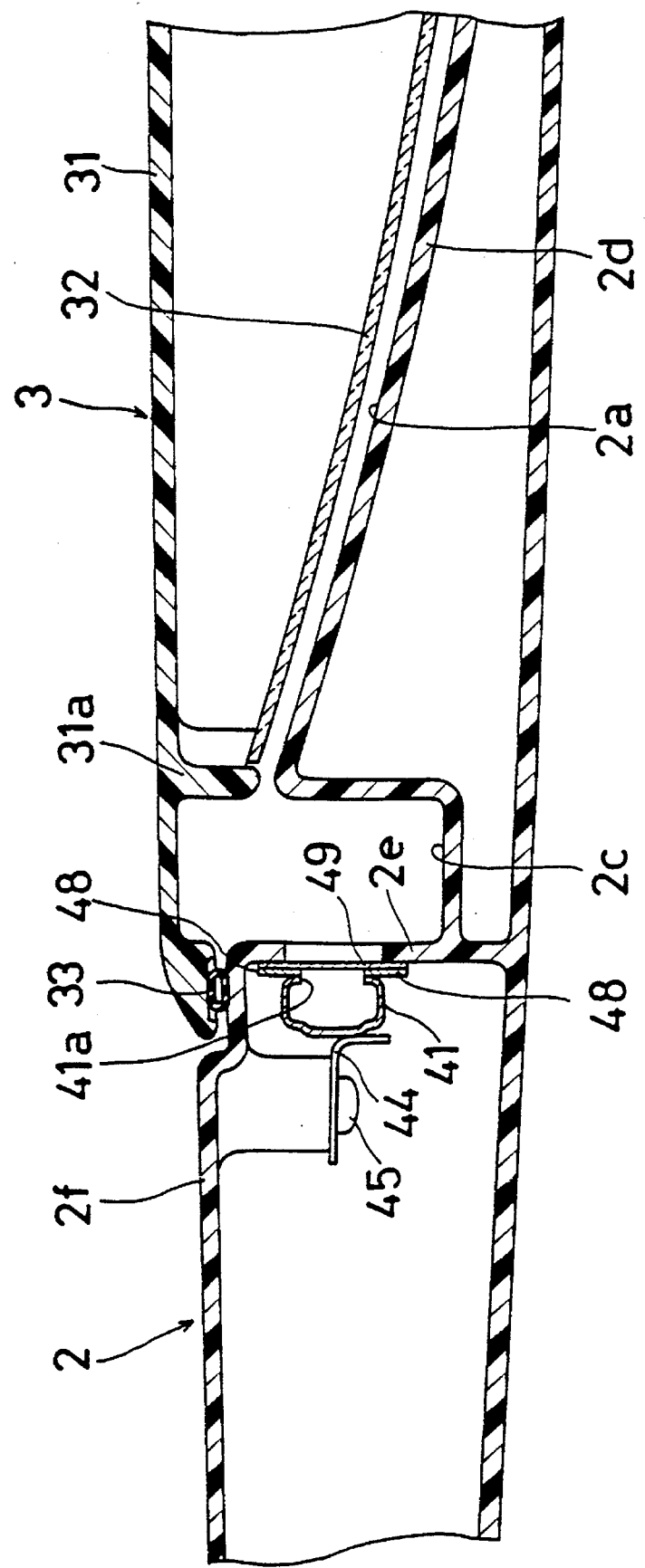
FIG. 4 is the other partial sectional view of an under view mirror apparatus for a vehicle of the present invention.

FIGS. 1 and 2 show a rear window 1a disposed on the rear portion of a vehicle 1 and a deflector 2, as a hollow member, fixed on the upper portion of the rear window 1a. When the vehicle moves, the deflector 2 modifies the flow of air which streams at the rear portion of the vehicle so that the air resistance may be reduced. The deflector 2 blows air on the rear window 1a so that the rear window 1a may be cleaned, especially through the removal of rain drops. The deflector 2 comprises a first concave portion 2a, a pair of second concave portions 2b disposed at both sides of the first concave portion 2a and a third concave portion 2h disposed at the upper portion of the first concave portion 2a. The first concave portion 2a is capable of receiving a movable member 3 (described later), as a mirror structure, and each of the second concave portions 2b respectively receives a first operating mechanism 4 and a second operating mechanism 4' (described later) which support the movable member 3 on the deflector 2. A braking lamp 5 which is connected with the braking operation of the vehicle 1 is received in the third concave portion 2h. The first operating mechanism 4 and the second operating mechanism 4' move the movable member 3 between an unoperational condition (as A shown in FIG. 1) in which the movable member 3 is received in the deflector 2 and an operational condition (as B shown in FIG. 1) in which movable member 3 projects out from the deflector 2.

In FIGS. 1, 2, 3 and 4 the movable member 3 is formed with a movable body 31 and a convex mirror 32. The movable body 31 constitutes a part of the outer housing of the deflector 2 in the unoperational condition A of the movable member 3. The convex mirror 32 is fixed on a standing wall 31a of the movable body 31 at the circumference thereof. The convex mirror 32 is covered with the deflector 2 and a bottom wall 2d formed with the first concave portion 2a in the unoperational condition A of the movable member 3. The convex mirror 32 reflects the rear and lower portion of the vehicle when the movable member 3 is in the operational condition B. The movable body 31 includes a lapping portion 31b which covers the second concave portions 2b and overlaps an outer wall 2f in the unoperational condition A of the movable member 3. The lapping portion 31b includes a sealing member 33 which contacts the outer wall 2f provides a seal between the outer wall 2f and the lapping portion 31b. The sealing member 33 prevents rain water and dust from going between the deflector 2 and the movable member 3. Furthermore, the sealing member 33 keeps the convex mirror 32 clean and prevents incomplete operation of the movable member 3 and the first operating mechanism 4 in the event of a freeze thereof.

Figure 5:
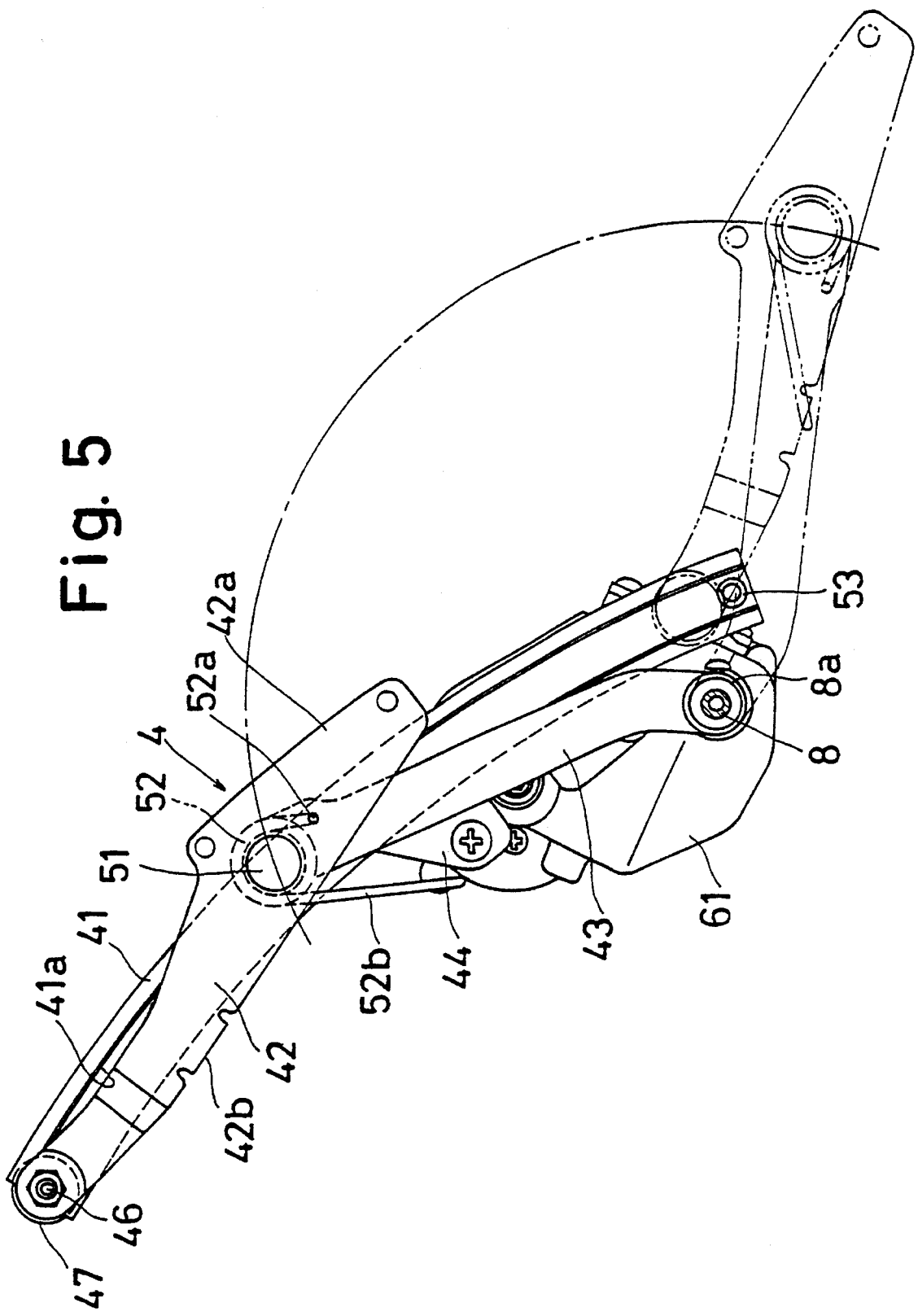
FIG. 5 is a side view of the first operating mechanism of an under view mirror apparatus for a vehicle of the present invention.
Figure 8:
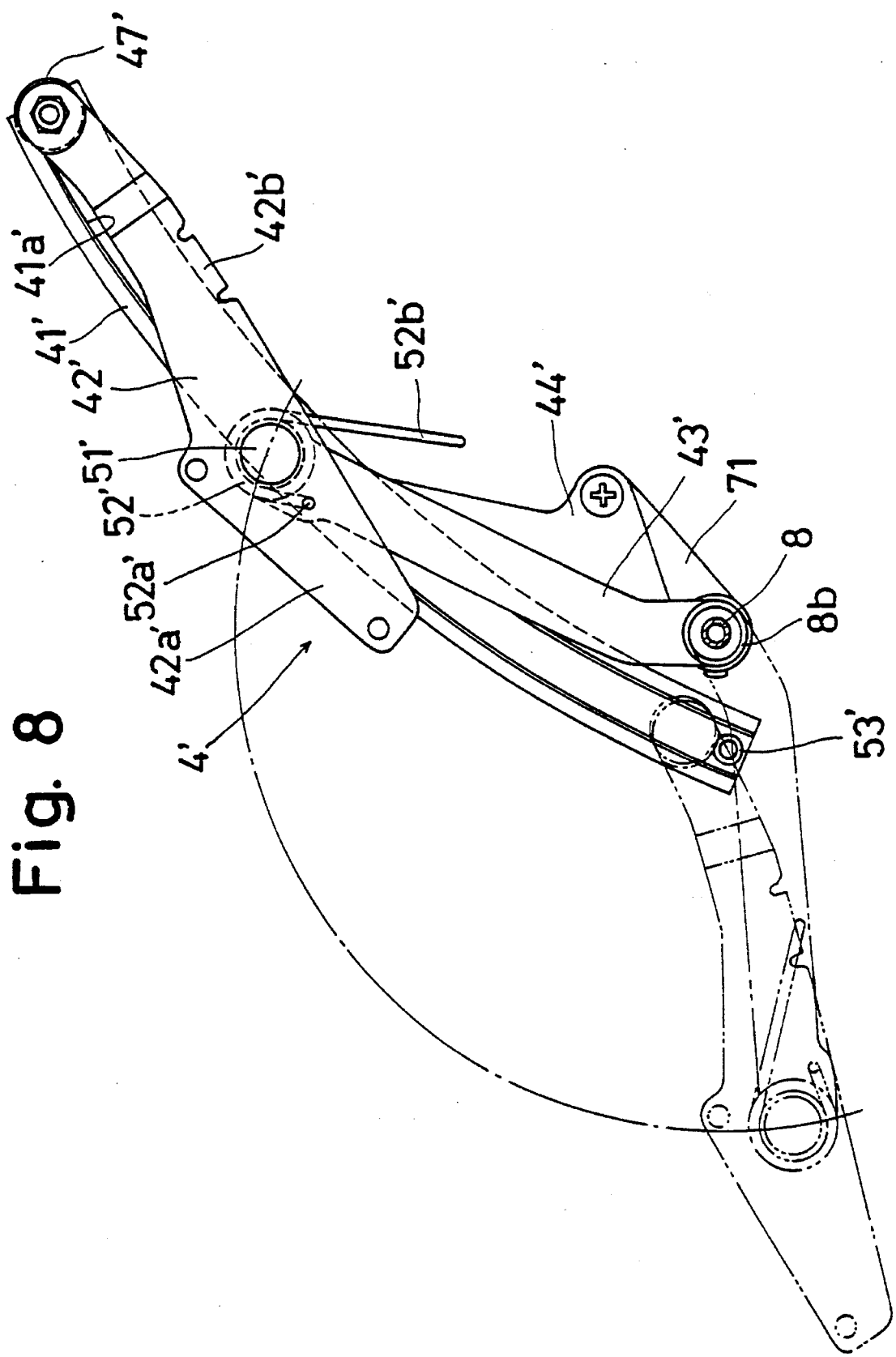
FIG. 8 is a side view of the second operating mechanism of an under view mirror apparatus for a vehicle of the present invention.

In FIGS. 2 and 5 the first operating mechanism 4 includes a guide rail 41, a first link 42 and a second link 43. The first link 42 is slidably fixed on the guide rail 41 and is connected to one side of the movable member 3. The second link 43 is connected to the first link 42 and a driving mechanism 6 (described later). On the other hand, in FIG. 8 the second operating mechanism 4' includes a guide rail 41', a first link 42' and a second link 43'. The first link 42' is slidably fixed on the guide rail 41' and is connected to the other side of the movable member 3. The second link 43' is connected to the first link 42' and a driven mechanism 7 (described later).

Referring to the first operating mechanism 4, in FIGS. 2 to 7 the guide rail 41 extends in the vertical direction of the deflector 2. The guide rail 41 possesses a C-shaped configuration in section and an arch shape in the longitudinal direction. The guide rail 41 is fixed on the deflector 2 by screws 45 that pass through brackets 44. The guide rail 41 includes an opening 41a which is opposed to a side wall 2e that constitutes the second concave portion 2c. The side wall 2e includes a slit 2g which is formed in the longitudinal direction of the guide rail 41 and is opposed to the opening 41a. Furthermore the opening 41a is covered with a pair of sealing members 49 which are disposed between a plate member 48 fixed on the guide rail 41 and the side wall 2e. The sealing members 49 prevent rain water and dust from going into the guide rail 41. Thus, corrosion of the guide rail 41 and outflow of grease are prevented.

A pin 46 extending into the guide rail 41 through the slit 29 and the opening 41a stands on the first link 42. A roller 47 is rotatably disposed around the pin 46 and is slidably supported on the guide rail 41. Therefore the first link 42 is slidably supported on the guide rail 41 through the pin 46 and the roller 47. Furthermore, a cushion member 50 which slidably contacts the bottom wall of the guide rail 41 is fixed on one end of the pin 46. The cushion member 50 fills up a clearance between the guide rail 41 and the roller 47 so the roller 47 maintains smooth sliding motion. The sealing members 49 are elastic and formed into a tapered-shaped configuration in section. One end of each of the sealing members 49 closely contacts the pin 46. The roller 47 slides along in the guide rail 41 spreading out the sealing members 49 when the first link 42 is moved along the guide rail 41. A bracket portion 42a is disposed at one end of the first link 42 and is fixed on the standing wall 31a of the movable body 31 by screws (not shown in FIGURES). Therefore the first link 42 is connected with the movable member 3. Furthermore, a stopping member 53 which is able to contact the roller 47 is disposed on the lower end of the guide rail 41. The stopping member 53 restricts the movement of the second link 43.

One end of the second link 43 is rotatably supported on the first link 42 by a screw 51, so that the second link 43 is connected with the first link 42. A spring member 52 is disposed around the screw 51. One end 52a of the spring member 52 engages an engaging hole of the second link 43 and the other end 52b is able to contact the flange portion 42b which is disposed an the first link 42. In contrast, one end of the second link 43 may support the movable member 3. In case of this, the other end of the first link 42 is fixed to the lower side of the movable member 3 (the lower side of the movable member 3 under the condition A shown in FIG. 1) and one end of the second link 43 is fixed to the upper side of the movable member 3 (the upper side of the movable member 3 under the condition B shown in FIG. 1). The description of the details of the second operating mechanism 4' are omitted because the second operating mechanism 4' is similar to the first operating mechanism 4.

Figure 6:
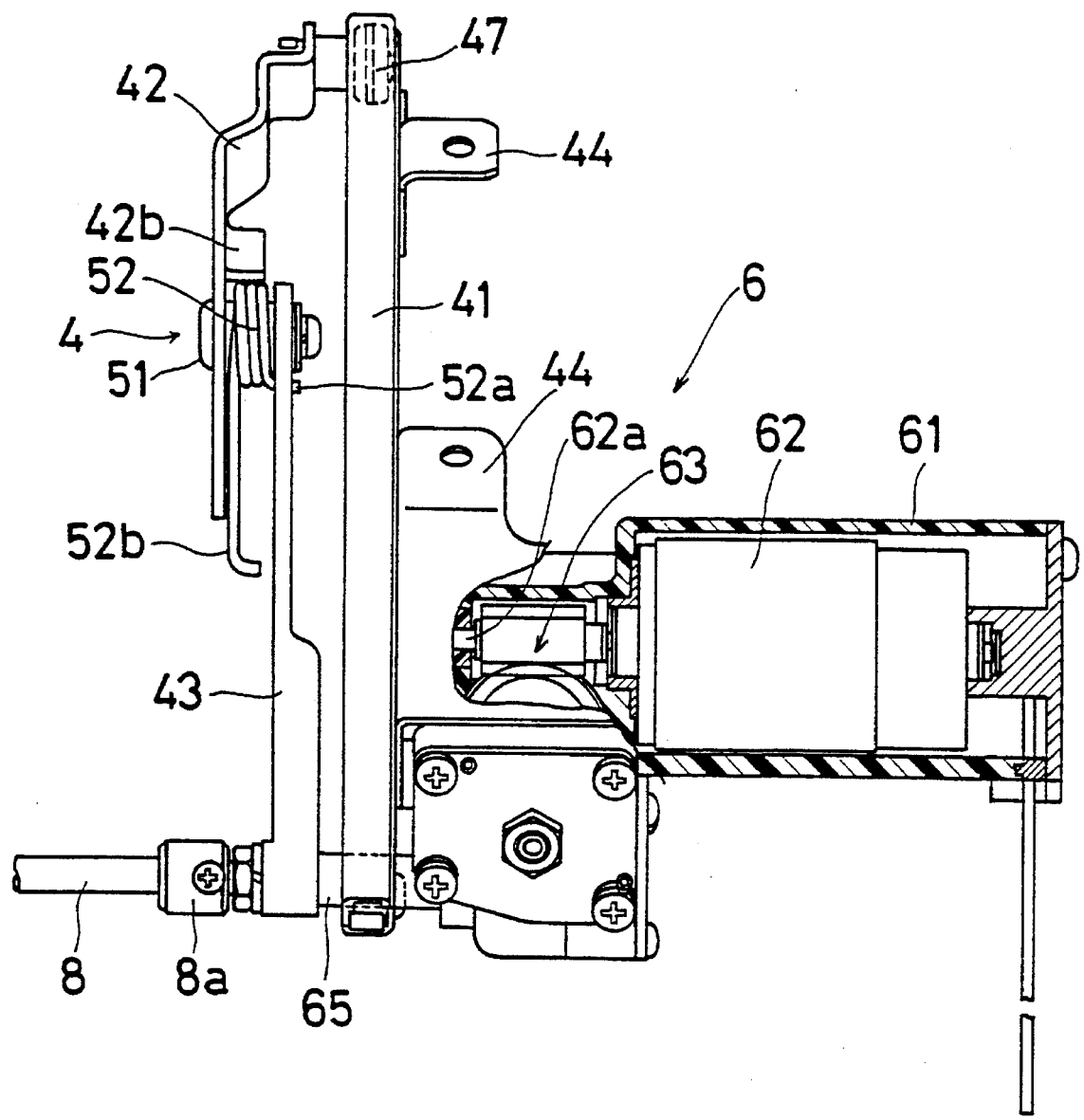
FIG. 6 is an elevational view with a partial sectional view of the first operating mechanism shown in FIG. 5.
Figure 7:
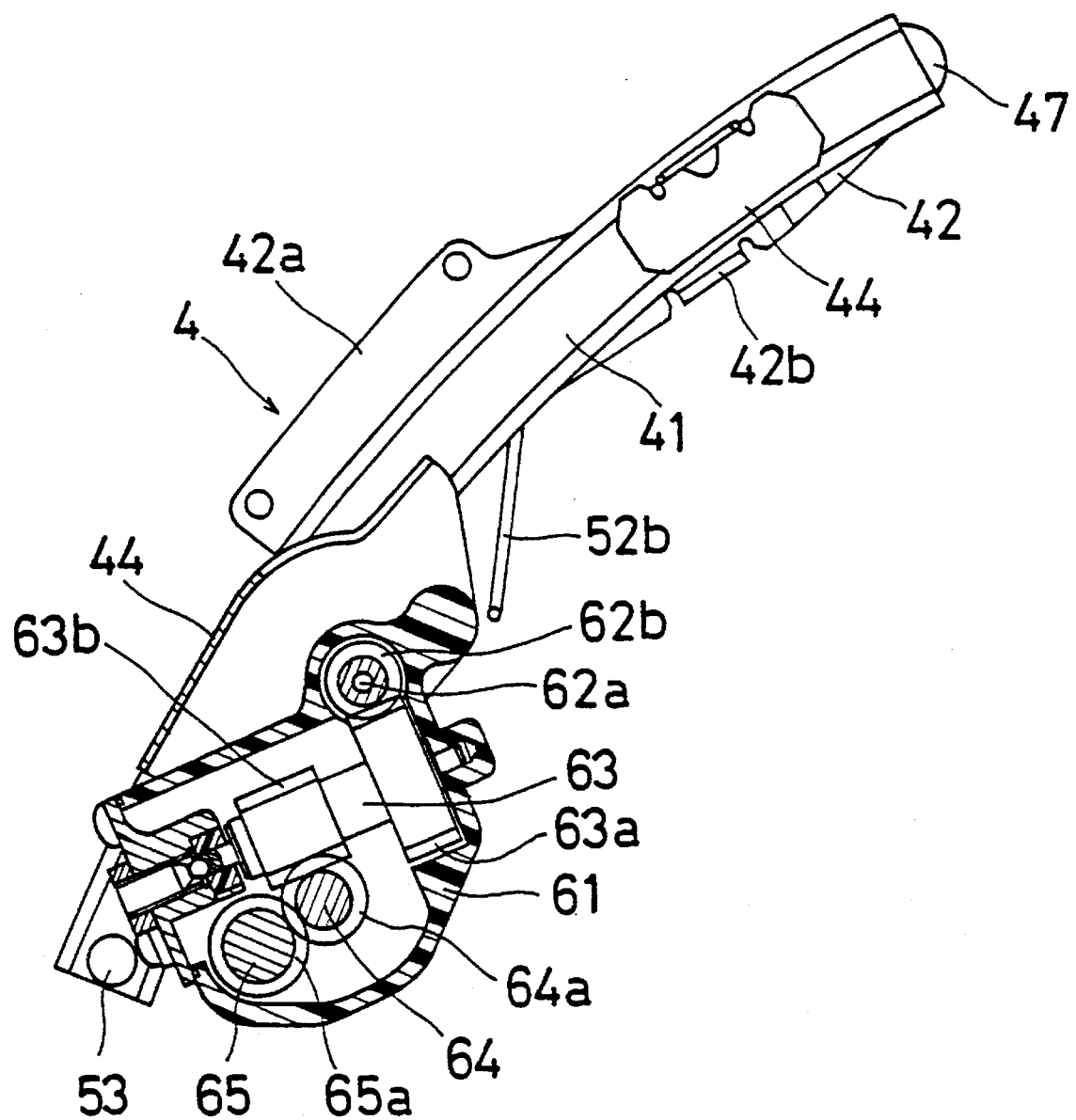
FIG. 7 is a side plan view with a partial sectional view of the first operating mechanism shown in FIG. 5.

Referring to the driving mechanism 6, in FIGS. 6 and 7 the driving mechanism 6 is received in a case 61 which is fixed to the bracket 44. Therefore the driving mechanism 6 is disposed in the deflector 2. An electric motor 62 is housed in the case 61 and an output shaft 62a is connected to a first worm gear 62b. A transmitting shaft 63 is rotatably supported in the case 61 by conventional bearing mechanisms and the transmitting shaft 63 is formed integrally with the first gear 63a which engages the first worm gear 62b and a second worm gear 63b. Each of the first output shaft 64 and the second output shaft 65 is rotatably supported in the case 61 by conventional bearing mechanisms. The first output shaft 64 is formed integrally with a second gear 64a. The second output shaft 65 is formed integrally with a third gear 65a. The second gear 64a engages both the second worm gear 63b and the third gear 65a. One end of the second output shaft 65 extends out of the case 61 through a bore of the case 61 and one end of the second output shaft 65 is connected to the other end of the second link 43 by a nut. Therefore, the driving mechanism 6 is connected with the second link 43. A connecting shaft 8 is disposed in the deflector 2 in the longitudinal direction of the movable member 3. One end of the second output shaft 65 is connected to the connecting shaft 8 by a collar 8a.

Figure 9:
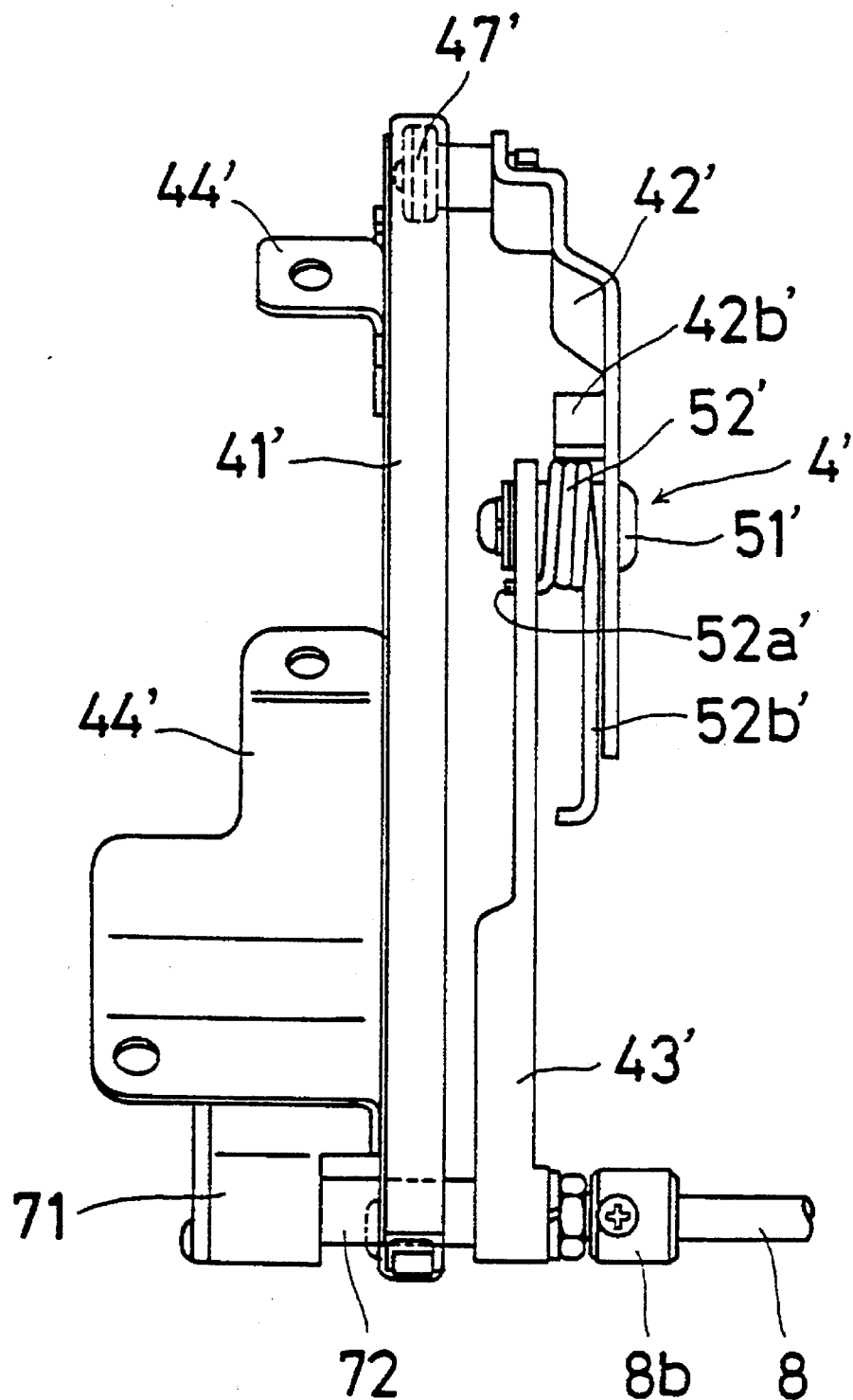
FIG. 9 is an elevational view of a second operating mechanism shown in FIG. 8.
Figure 10:
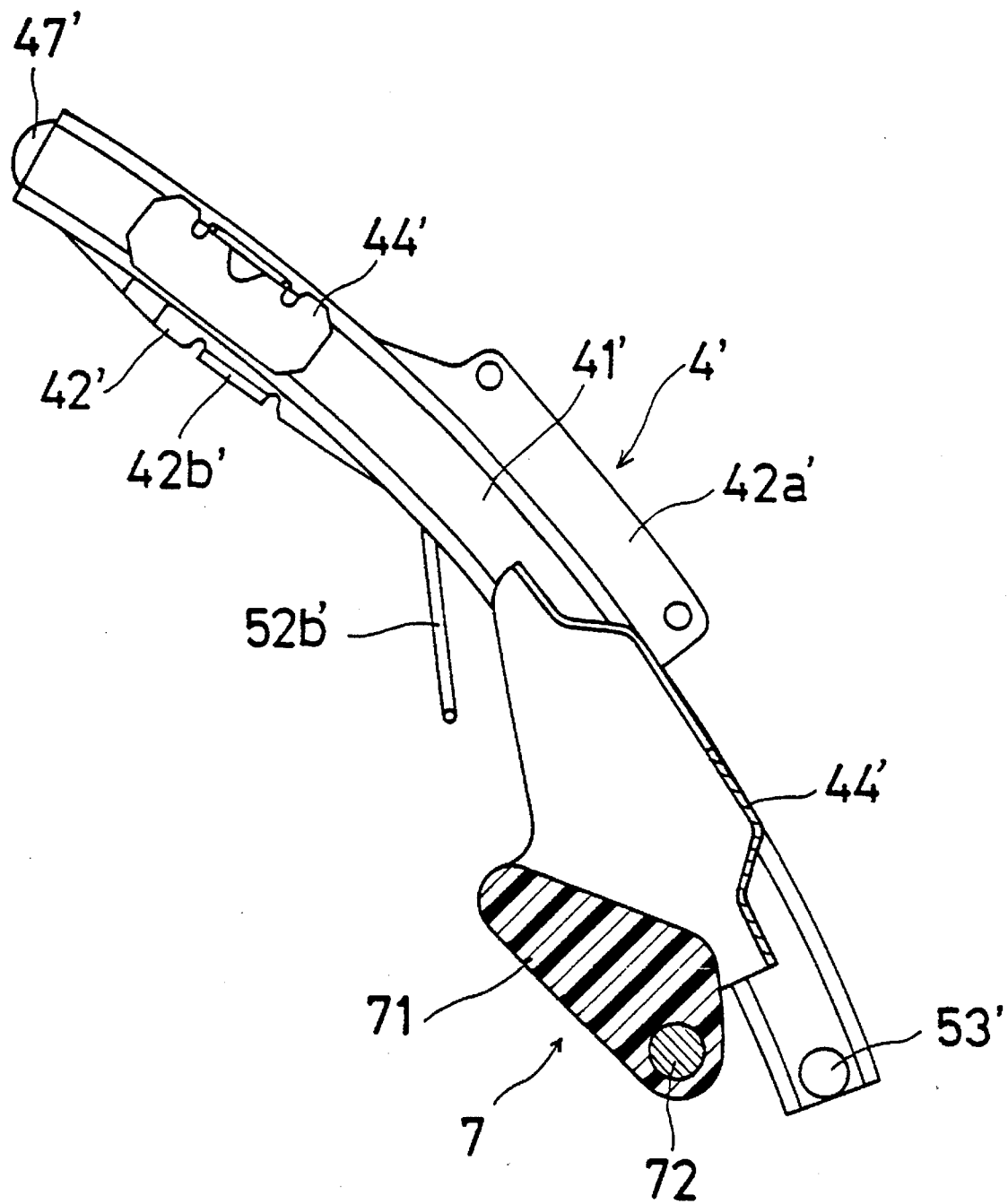
FIG. 10 is a side elevational view with a partial sectional view of the second operating mechanism shown in FIG. 8.

Referring to the driven mechanism 7, in FIGS. 9 and 10 the driven mechanism 7 is received in a case 71 which is fixed to the bracket 44 Therefore the driven mechanism 7 is disposed in the deflector 2. The third output shaft 72 is rotatably supported in the case 71 by the conventional bearing mechanisms. One end of the third output shaft 72 extends out of the case 71 through a bore of the case 71 and an opposite end of the third output shaft 72 is connected to the other end of the second link 43' by a nut. One end of the third output shaft 72 is connected to the connecting shaft 8 by a collar 8b. Therefore the driving mechanism 6 is connected with the driven mechanism 7. Consequently, the driving mechanism 6 directly drives the first operating mechanism 4 and the second operating mechanism 4' without the medium of the movable member 3, and the second operating mechanism 4' is synchronized with the first operating mechanism 4. Therefore, the movable member 3 is moved by the first operating mechanism 4 and the second operating mechanism 4' at both sides thereof.

Figure 12:
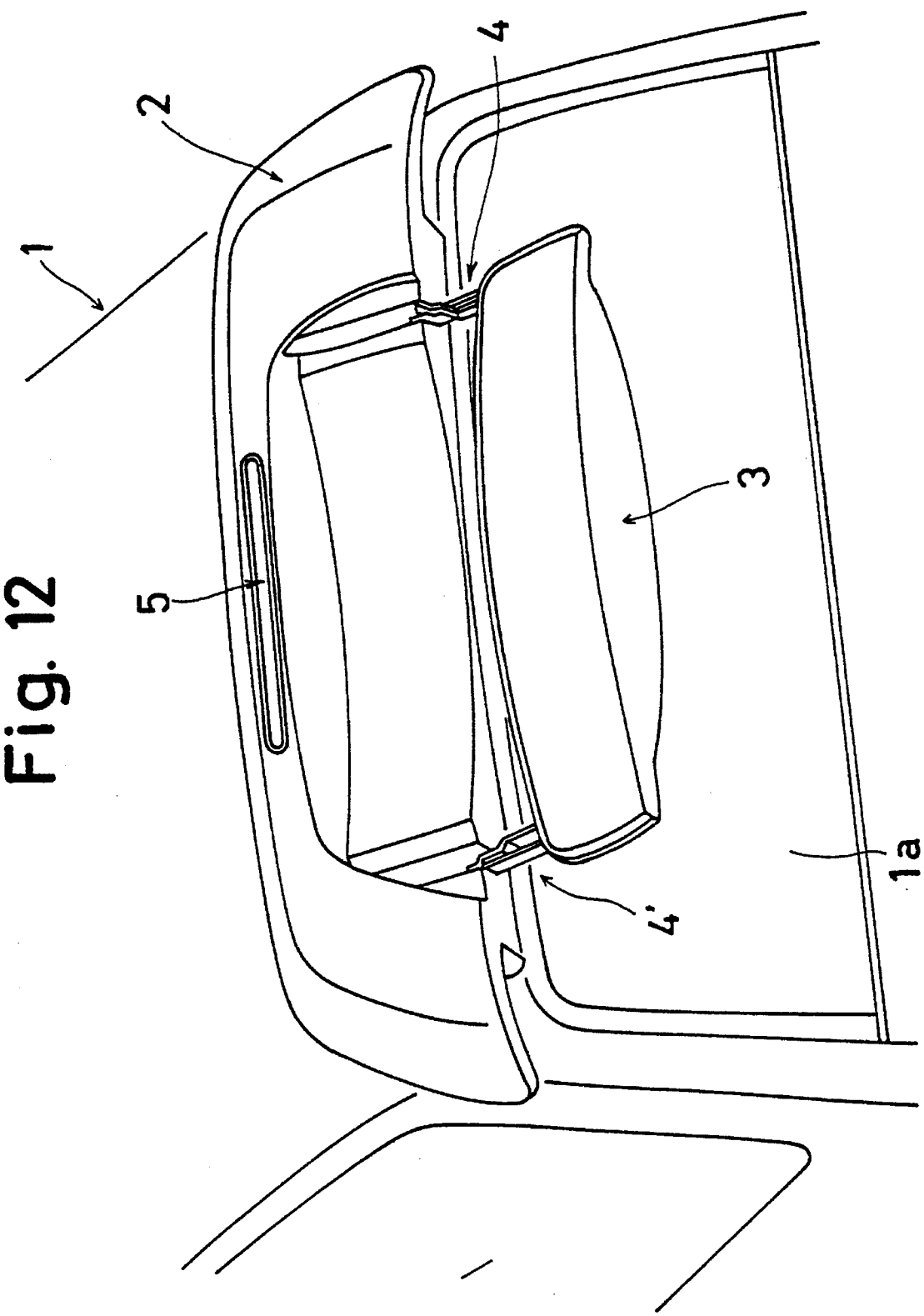
FIG. 12 is a perspective view of an under view mirror apparatus for a vehicle of the present invention under an operational condition.

The operation of the under view mirror apparatus for a vehicle according to the present invention will be described hereinafter. When the electric motor 62 is driven with the movable member 3 in the unoperational condition A, the second output shaft 65 is driven through the transmitting shaft 63 and the first output shaft 64. The rotational operation of the second output shaft 65 is transmitted to the first operating mechanism 4. The rotational operation of the second output shaft 65 is transmitted to the driven mechanism 7 through the connecting shaft 8. The rotational operation of the connecting shaft 8 is transmitted to the second operating mechanism 4' through the third output shaft 72. Therefore, the second operating mechanism 4' is synchronized with the first operating mechanism 4. When each of the second links 43, 43' is rotated in the clockwise direction in FIG. 1 by the rotation of the second output shaft 65 and the third output shaft 72, each of the first links 42, 42' is slid toward the lower direction in FIG. 1 along the guide rails 41, 41' so as to be rotated in the counter clockwise direction in FIG. 1. Therefore, the movable member 3 projects out from the deflector 2 by the first operating mechanism 4 and the second operating mechanism 4'. Furthermore, each of the first links 42, 42' engages the other ends 52b of the spring members 52 because of the rotatable and slidable movement of the first links 42, 42'. Each of the first links 42, 42' continues to compress the spring members 52 during the rotatable and slidable movement. When the first links 42, 42' engage the stopping members 53, the electric motor 62 is powered down by an overload detecting means and the movable member 3 reaches the operational condition B shown in FIGS. 1 and 12. In the operational condition B, the first links 42, 42' are forced by the spring members 52.

Figure 11:
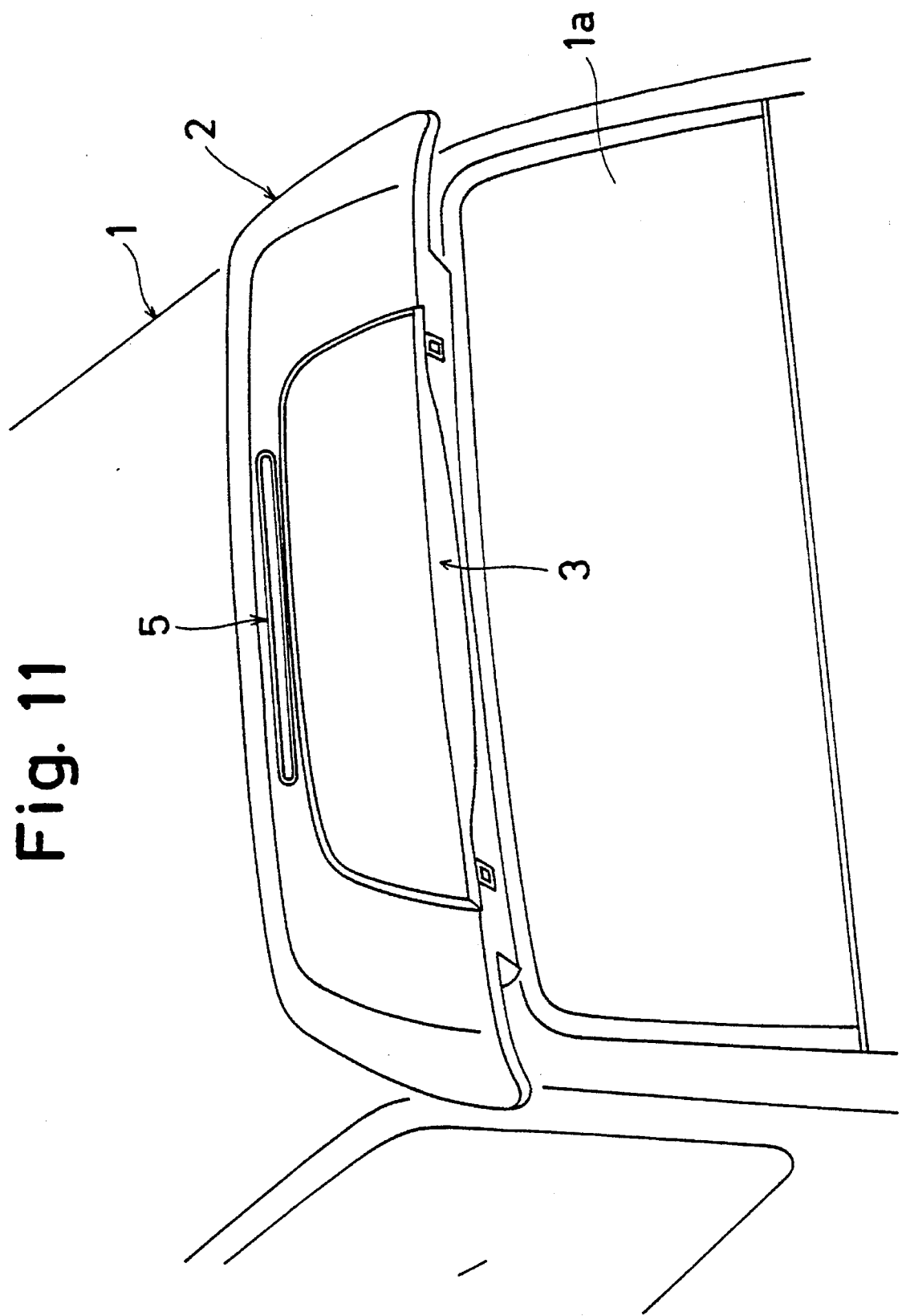
FIG. 11 is a perspective view of an under view mirror apparatus for a vehicle of the present invention under an unoperational condition.

When the electric motor 62 is driven in the opposite direction relative to the above mentioned direction, the second links 43 and 43' are rotated in the counter clockwise direction in FIG. 1. The first links 42, 42' are slid in the upper direction and are rotated in the clockwise direction in FIG. 1. The elastic force which the first links 42, 42' receive by the compressed spring members 52 assists this movement of the first links 42, 42'. When the movable member 3 is received in the deflector 2, the electric motor 62 is powered down by an overload detecting means and the movable member 3 reaches the unoperational condition A shown in FIGS. 1 and 11.

The movable member 3 is moved between the unoperational condition and the operational condition by the rotatable operation of the second links 43, 43 and the slidable operation of the first links 42, 42'. Therefore, the movable member 3 is steadily supported and is moved smoothly. Consequently, this prevents the movable member 3 from interfering with the deflector 2 in the unoperational condition A and the visibility in the rear portion of the vehicle is secured. Furthermore, each of the first links 42, 42' is smoothly slid through the rollers 47, 47' because the sealing members 49 prevent rain water and dust from going into each of the guide rails 41, 41' and prevent the corrosion of each of the guide rails 41, 41' and the outflow of grease. Therefore the movable member 3 is able to smoothly slide.

Because the movable member 3 is positioned by contacting the first links 42, 42' and the stopping members 53, 53' in the operational condition B, the movable member 3 is prevented from being positioned out of the regular position.

Furthermore, because each of the operating mechanisms 4, 4' is composed of the guide rails 41, 41' the first links 42, 42' and the second links 43, 43', each of the operating mechanisms 4, 4' has only a few number of parts. Therefore, each of the operating mechanisms 4, 4' is small in size and light in weight, and the movable member 3 may be enlarged in the deflector 2 in order to expand the visibility.

Furthermore, because the movable member 3 is moved through operation of each of the second links 43, 43' in a small track, the movable member 3 is prevented from interfering with other things and the moment force operating from the movable member 3 to each of the operating mechanisms 4, 4' can be decreased. Therefore, each of the operating mechanisms 4, 4' can be light in weight and the noise associated with operation of each of the operating mechanisms 4, 4' can be reduced.

The second operating mechanism 4' is completely synchronized with the first operating mechanism 4 because the second operating mechanism 4' is directly driven by the driven mechanism 7 through the connecting shaft 8 without the movable member 3. Therefore the movable member 3 may be enlarged in order to expand the visibility.

While the invention has been particularly shown and described with reference to preferred embodiments thereof, it will be understood by those skilled in the art that the foregoing and other changes in form and details can be made therein without departing from the spirit and scope of the invention.

What is claimed is:

1. An under view mirror apparatus for a vehicle comprising:

a mirror structure mountable on a rear portion of a vehicle and selectively positionable in either a first condition in which the mirror structure is stored in the rear portion of the vehicle and a second condition in which the mirror structure projects out from the rear portion of the vehicle;

an operating mechanism which is to be disposed between the rear portion of the vehicle and the mirror structure and which supports the mirror structure for movement between the first condition and the second condition; and driving means operatively associated with the operating mechanism for moving the mirror structure between the first condition and the second condition, said operating mechanism including;

a guide rail for being fixed on the rear portion of the vehicle, a first link having first and second ends, the first end of the first link being connected to the mirror structure and the second end of the first link being supported on the guide rail through a roller which is slidably disposed in the guide rail to slide along the guide rail in a direction of longitudinal extent of the guide rail, and a second link having a first end and a second end, the first end of the second link being connected to one of the mirror structure and the first end of the first link, the second end of the second link being connected to the driving means for bringing the mirror structure into rotational movement between the first condition and the second condition under a driving action of the driving means, the second link being mounted so as to be rotatable about the second end of the second link.

2. An under view mirror apparatus for a vehicle as recited in claim 1, wherein the guide rail includes a stopping member, and the mirror structure is positioned in the second condition by contacting engagement between the roller and the stopping member.

3. An under view mirror apparatus for a vehicle as recited in claim 1, including an opening in said guide rail and a sealing member covering said opening, said roller being supported in said guide rail.

4. An under view mirror apparatus for a vehicle as recited in claim 1, including a connecting member positionable in the rear portion of the vehicle which connects the second link in the operating mechanism with the driving means.

5. An under view mirror apparatus for a vehicle as recited in claim 1, wherein the first end of the second link is rotatably connected to the first end of the first link so that the first link is rotatable relative to the second link.

6. An under view mirror apparatus for a vehicle as recited in claim 1, wherein the first end of the second link is rotatably connected to one of the mirror structure and the first end of the first link so that said one of the mirror structure and the first link is rotatable relative to the second link.

7. A mirror apparatus to be mounted on a rear portion of a vehicle, comprising:

a mirror structure positionable at a rear portion of a vehicle and movable between one position in which the mirror structure is in a stored condition and another position in which the mirror structure allows the rear portion of the vehicle to be viewed;

a first link connected to said mirror structure;

a second link rotatably connected to the first link;

a guide rail having a longitudinal extent, a portion of said first link being mounted on and slidable along the guide rail;

drive means connected to the second link for rotatably driving the second link to rotate the mirror structure from the one position to the another position and from the another position to the one position while the first link slides along a slot in the guide rail.

8. A mirror apparatus according to claim 7, wherein the guide rail includes a slot, and including a pin connected to the first link and a roller mounted on the pin, said pin and roller being positioned in the slot of the guide rail for allowing the first link to move along the guide rail.

9. A mirror apparatus according to claim 8, wherein said guide rail is provided with an opening through which the pin and roller extend, and including at least one sealing member positioned adjacent the opening for inhibiting access into the guide rail.

10. A mirror apparatus according to claim 9, wherein said guide rail is arch shaped.

11. A mirror apparatus according to claim 8, including a spring connected to the first link and the second link for imparting a biasing force to the first and second links.

12. A mirror apparatus according to claim 11, wherein said spring is disposed about said pin.

13. An under view mirror apparatus for a vehicle comprising:

a mirror structure mountable on a rear portion of a vehicle and selectively positionable in either a first condition in which the mirror structure is stored in the rear portion of the vehicle and a second condition in which the mirror structure projects out from the rear portion of the vehicle;

an operating mechanism which is to be disposed between the rear portion of the vehicle and the mirror structure and which supports the mirror structure for movement between the first condition and the second condition; and driving means operatively associated with the operating mechanism for moving the mirror structure between the first condition and the second condition, said operating mechanism including;

a guide rail for being fixed on the rear portion of the vehicle, a first link having first and second ends, the first end of the first link being connected to the mirror structure and the second end of the first link being slidably supported on the guide rail to slide along the guide rail in a direction of longitudinal extent of the guide rail, and a second link having first and second ends, the first end of the second link being connected to one of the mirror structure and the first end of the first link and the second end of the second link being connected to the driving means for bringing the mirror structure into rotational movement between the first condition and the second condition under a driving action of the driving means, the second link being mounted for rotational movement about the second end of the second link.

14. An under view mirror apparatus for a vehicle as recited in claim 13, wherein the first end of the second link is rotatably connected to one of the mirror structure and the first end of the first link so that said one of the mirror structure and the first link is rotatable relative to the second link.

15. An under view mirror apparatus for a vehicle as recited in claim 13, wherein the first end of the second link is rotatably connected to the first end of the first link so that the first link is rotatable relative to the second link.

* * * * *